United States Patent [19]
Thomas et al.

[11] Patent Number: 5,725,290
[45] Date of Patent: Mar. 10, 1998

[54] VALVE HOUSING CAP WITH REMOVABLE COVER AND EXTERNAL PLUG CONNECTOR

[75] Inventors: Gerhard Thomas, Fuerth; Karl Wutz, Sengenthal; Klaus Lechner, Eckental, all of Germany

[73] Assignee: Robert Bosch GmbH, Stuttgart, Germany

[21] Appl. No.: 671,766

[22] Filed: Jun. 28, 1996

[30] Foreign Application Priority Data

Aug. 1, 1995 [DE] Germany ............ 195 28 252.3

[51] Int. Cl.[6] ............................................. B60T 13/00
[52] U.S. Cl. ............................. 303/119.2; 439/34
[58] Field of Search ............... 303/119.2; 137/596.17; 439/34, 76.1, 76.2, 892, 893, 901; 336/90; 307/10.1, 147, 150

[56] References Cited

U.S. PATENT DOCUMENTS

| | | | |
|---|---|---|---|
| 4,337,794 | 7/1982 | Yamanaka et al. | 137/596.17 |
| 5,022,717 | 6/1991 | Heibel et al. | 303/119.2 |
| 5,040,853 | 8/1991 | Burgdorf et al. | 303/119.2 |
| 5,127,440 | 7/1992 | Maas et al. | 303/119.2 X |
| 5,275,478 | 1/1994 | Schmitt et al. | 303/119.2 |
| 5,482,362 | 1/1996 | Robinson | 303/119.2 |
| 5,497,036 | 3/1996 | Zemlicka | 439/34 X |

FOREIGN PATENT DOCUMENTS

| | | | |
|---|---|---|---|
| 0373551 | 6/1990 | European Pat. Off. | |
| 2917952 | 11/1980 | Germany | 439/34 |
| 4221137 | 1/1994 | Germany | 439/34 |
| 4025320 | 11/1994 | WIPO | 303/119.2 |

*Primary Examiner*—Josie Ballato
*Attorney, Agent, or Firm*—Edwin E. Greigg; Ronald E. Greigg

[57] ABSTRACT

The invention is based on a unit for a vehicle brake system, having a housing block into which magnet valves and optionally other components to be interconnected electrically are built in. The magnet valves are covered by a housing cap, which has externally accessible plug connectors for the magnet valves. To protect the plug connectors against splashing water and dirt when the unit is mounted near the wheel, at least one cover provided, which together with the housing cap forms cable leadthroughs for cables that are connected electrically to the plug connectors.

20 Claims, 2 Drawing Sheets

VALVE HOUSING CAP WITH REMOVABLE COVER AND EXTERNAL PLUG CONNECTOR

BACKGROUND OF THE INVENTION

The invention is based on a unit for a vehicle brake system as set forth hereinafter One such unit is known from European Patent Disclosure EP 0 373 551 A2. The known unit has a housing block which has built-in magnet valves and a pump that are hydraulically interconnected with one another. As electrical components, electromagnets of the magnet valves protrude from the housing block on one side. They are covered by a removable housing cap and are connected to one or more externally accessible plug connections in the housing cap. The known unit is a component of an anti-lock brake system and optionally a traction control system of the vehicle brake system.

In constructing utility vehicles, especially with pneumatic brake systems, the trend in development is to mount such a unit, which has pressure buildup and pressure reduction valves for a wheel brake cylinder, close to the wheel on one vehicle axle or on the vehicle frame, in order to shorten any time lag between actuation of one of the valves and response of the wheel brake cylinder. The units disposed near the vehicle wheels cooperate with a central regulating device. Because of their arrangement near the wheels, they are exposed to splashing water and dirt, and hence contact problems in the plug connection can occur over the course of their use.

OBJECT AND SUMMARY OF THE INVENTION

The unit according to the invention has the advantage that its plug connection is covered and thus protected against splashing water, dirt and damage, for instance from being hit with stones, and in this way assures durably good contacting of the plug connection.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
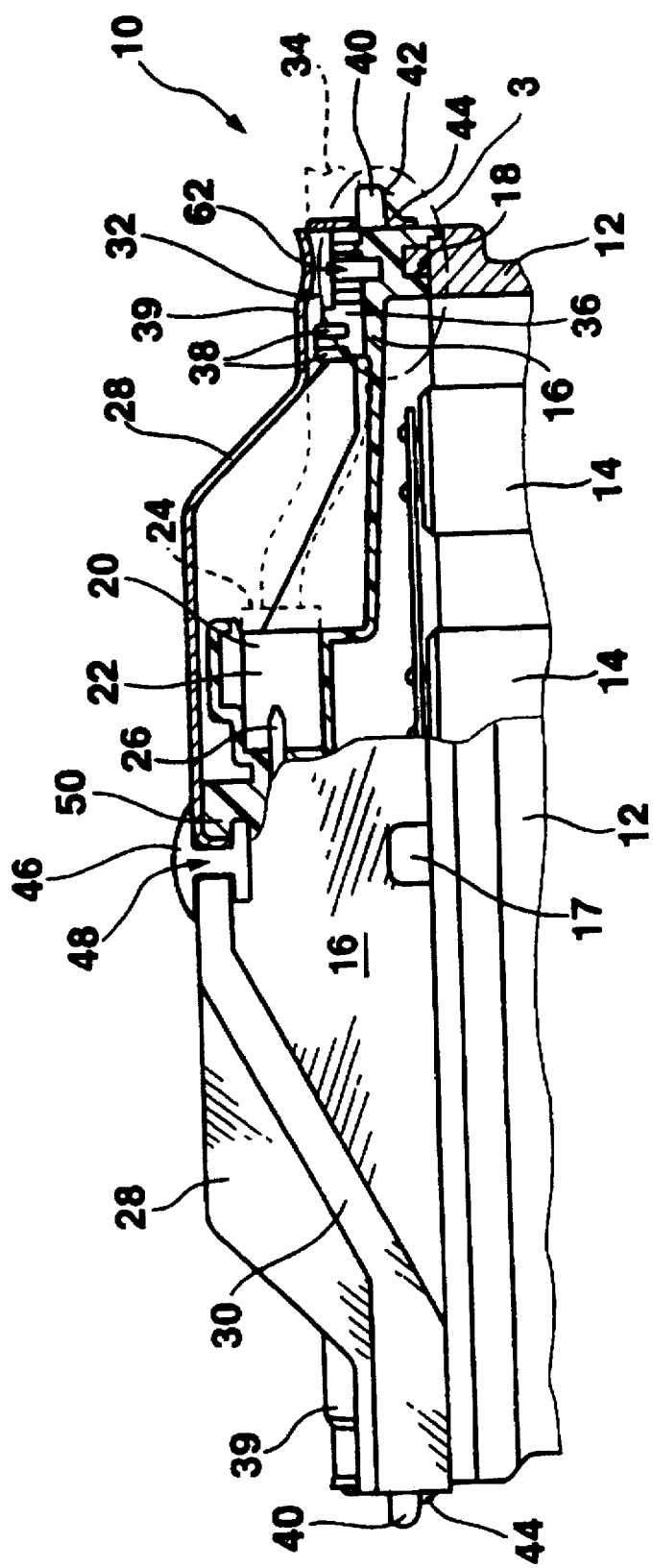
FIG. 1, partly in section, shows unit according to the invention.

The unit 10 according to the invention, shown in FIG. 1, has a housing block 12 which is intended for mounting close to a wheel on a vehicle frame or on one axle of a vehicle. Magnet valves 14 for brake pressure modulation are built into the housing block 12. The housing block 12 is of die-cast aluminum, for instance.

A housing cap 16 is mounted on the housing block 12, for instance being secured to it with screws 17. In the exemplary embodiment, the housing cap 16 is an injection-molded plastic part. It is sealed off from the housing block 12 by an encompassing seal 18 (see FIG. 3), which is placed in a groove in the housing cap 16. The housing cap 16 tightly closes the magnet valves 14 in the housing block 12.

The housing cap 16, in the exemplary embodiment, has two groups each with four plug couplings 20 disposed side-by-side, which are accessible from the outside of the housing cap 16. The plug couplings 20 of both groups are disposed facing away from one another (in FIG. 1, only the plug couplings 20 oriented toward the right are visible).

The plug couplings 20 have a plug socket 22 for insertion of a plug 24, represented by dashed lines in FIG. 1. Electrical contacts 26 protrude into the plug socket 22.

The magnet valves 14 are electrically connected to a printed circuit board (not shown) disposed in the housing block 12. Electrical components, in particular a microprocessor, for controlling or regulating the magnet valves 14 may be accommodated on the printed circuit board. Electrically connecting the unit 10 of the invention, located near the wheel, to a central regulating unit for the vehicle brake system, to rotation sensors and wheel brake cylinder pressure sensors and other components of the vehicle brake system, requires many cable connections, which are each embodied by a plurality of contacts 26 via the total of eight plug couplings 20.

To protect the plug connections, each comprising a plug 24 and plug coupling 20, against splashing water and dirt, two longitudinal covers 28 are placed on the housing cap 16; each of them covers one group of four side-by-side plug connections 20, 24 The covers 28 are made from deep-drawn sheet metal. With their edge 30, they fit over the housing cap 16 laterally.

On their edges remote from one another, that is, two outer edges remote from one another of the housing cap 16, the covers 28 together with the housing cap 16 form cable leadthroughs 32 for cables 34, represented by dashed lines in FIG. 1, of the plugs 24. To that end, in the region of the cable leadthroughs 32 each of, the covers 28 have barrel-shaped round bulges which are intended for contact with the cable 34 passed through them. For forming the cable leadthroughs 32, the housing cap 16 has ribs 36, which between them defined cable conduits of U-shaped cross section, which are expanded by the barrel-shaped bulges of the covers 28 to form the cable leadthroughs 32 of approximately round cross section. The spacing of the ribs 36 from the curves features is somewhat less than the diameter of the cable 34 to be placed therein, so that the cable will be firmly clamped to relieve it from tensile strain. The ribs 36 also have fins 38 which press into an emplaced cable 34 to relieve it from tensile strain. Tensile strain is relieved by the ribs 36 on the housing cap and the barrel-shaped arches as curvatures in the covering 28. These function as a clamp which together apply a pressure on the cable to prevent the cable from being pulled loose.

Because of the firm clamping of the cables 34 each of, the covers 28 are strained in the region of the cable leadthroughs 32. For the purpose of reinforcement and to receive a seal, not shown, the cover has a bead 39 extending transversely across the cable leadthroughs 32. This bead counteracts deformation of each of the covers 28 from the firm clamping of the cables 34 and thus brings about an adequate clamping force upon all the cables 34.

For attaching each of the covers 28 to the housing cap 16, the housing cap has guide pins 40 that protrudes parallel to the cable leadthroughs 32 and extending through corresponding recesses in each of the covers 28. The guide pins 40 have oblique faces 42 extending away from each of the covers 28 toward the housing cap 16. As a result, when each of the covers 28 are slipped onto the guide pins 40, which is done in the longitudinal direction of the cable leadthroughs 32 each of, the covers 28 move onto the housing cap 16, so that the inside clearance height of the cable leadthroughs 32 decreases and the cables 34 are firmly clamped. To increase the contact area between each of the covers 28 and the guide pins 40, tabs 44 are bent outward from each of the covers 28 and rest on the oblique faces 42 of the guide pins 40. The projection-type connection of each of the covers 28 to the housing cap 16 is located at the point where the cables 34, firmly clamped in the cable leadthroughs 32, exert a strain on each of the covers 28.

Once each of the covers 28 have been mounted on the guide pins 40, they are closed on their adjacent ends remote from the guide pins 40, that is, in a middle region of the housing cap 16, with a locking strip 46. The locking strip 46 is H-shaped in cross section. It is thrust laterally into a T-shaped groove 48 in the housing cap 16 and fits over an edge 50 of each of the cover 28. The each of the covers 28 are not strained on this side, and hence its fastening need not be designed as sturdily there.

Figure 2:
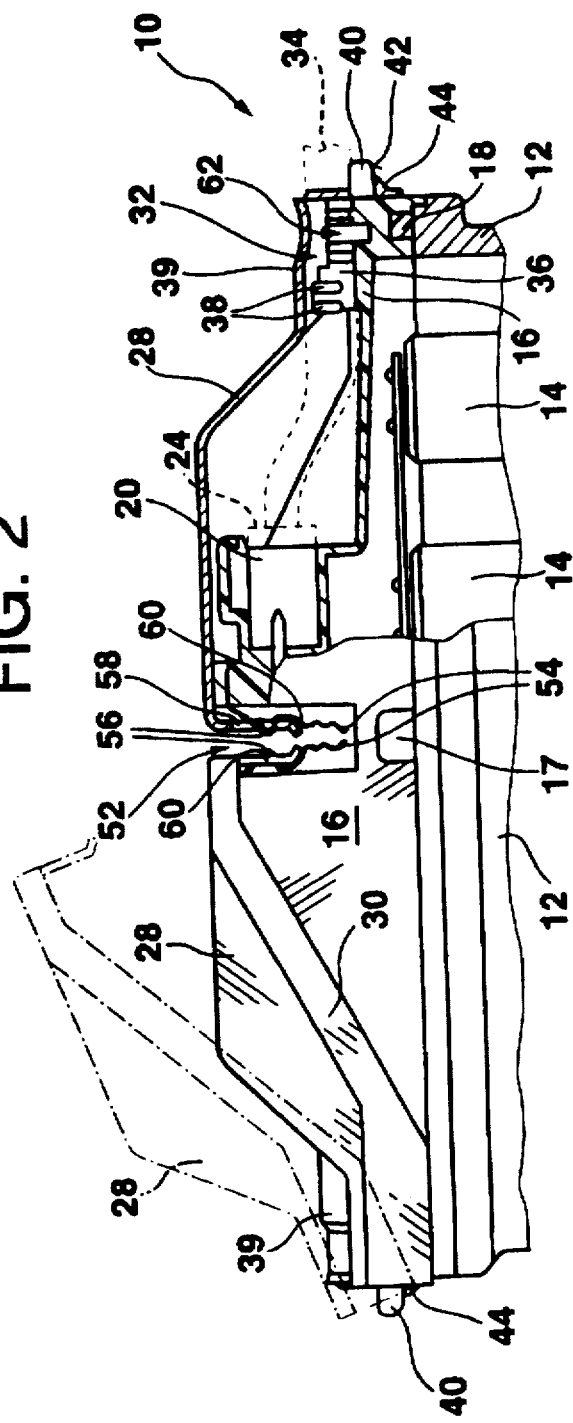
FIG. 2 is a modification of FIG. 1 which illustrates a different cover securing means with a portion of the cover shown in phantom.

FIG. 2 shows a modified option for securing each of covers 28 in the middle region of the housing cap 16 The housing cap 16 has a deep groove 52, into which spring tongues 54 protrude, one end of which is fixed nondetachably in the housing cap 16 by extrusion-coating in the manufacture of the housing cap. The spring tongues 54 have detent protrusions 56, which engage corresponding recesses 58 of each of the covers 28. The recesses 58 are mounted on tabs 60 of each of the covers 28 that protrude into the groove 52 of the housing cap 16.

For attaching each of the covers 28 to the housing cap 16, the housing cap is, as described in conjunction with FIG. 1, slipped onto the guide pins 40, and in the process the cables 34 are firmly clamped in the cable leadthroughs 32. Next, each of the covers 28 are pressed, on its side remote from the guide pins 40, into the groove 52 of the housing cap 16, until the detent protrusions 56 of the spring tongues 54 of the housing cap 16 lock into place in the recesses 58 of each of the covers 28. For removing each of the covers 28, the spring tongues 54 are pressed apart, for instance by means of a screwdriver pushed into the groove 52, until their detent protrusions 60 come out of engagement with each of the covers 28.

Figure 3:
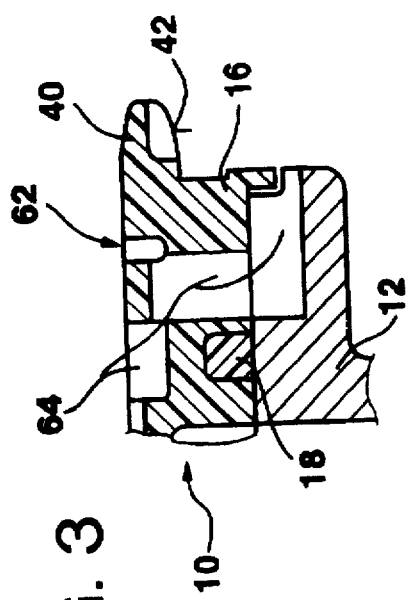
FIG. 3 shows on a layer scale a detail of the unit of FIG. 1 shown by oval identified by reference 3.

Each cover 28 may have a seal, not shown in the drawing, in its edge 30 that fits laterally over the housing cap 16. To allow condensed water formed below each cover 28 to drain off, the unit 10 according to the invention has a water drain, which is shown in FIG. 3. FIG. 3 shows a section in a plane parallel to the sectional plane of FIG. 1, on a larger scale. The section of FIG. 3 is located laterally beside the cable leadthroughs 32 and passes through the guide pins 40.

The housing cap 16 has a water drainage groove 62, which extends transversely to the cable leadthroughs 32 and discharges on both ends in a water drainage labyrinth 64, which comprises a plurality of communicating voids with many corners in the housing cap 16 and the housing block 12 and leads from the interior of the cover 28 to the outside of the unit 10 of the invention. Because of the arrangement of the labyrinth 64 with many corners, splashing water is prevented from being able to get into the interior of the cover 28.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A unit for a vehicle brake system, comprising a housing block, a housing cap which covers electrical components of the unit that are received by the housing block, said housing cap has at least one externally accessible electrical plug connector to which the electrical components are connected, the unit (10) has at least one removable cover (28), which covers said at least one externally accessible plug connector (20) and which together with the housing cap (16) forms at least one cable leadthrough (32) for at least one cable (34) of at least one plug (24) inserted into the at least one accessible externally plug connector (20).

2. The unit in accordance with claim 1, in which the unit (10) has an oblique guide (42) on a side of the at least one cable leadthrough (32), by way of which the at least one cover (28) is in positive engagement with the unit (10), and which moves the at least one cover (28) toward the housing cap (16) when the at least one cover is attached.

3. The unit in accordance with claim 2 in which the unit (10) has a detent connection (56, 58) on a side of the at least one cover remote from the at least one cable leadthrough (32).

4. The unit in accordance with claim 2, in which the at least one cover (28) has a reinforcement (39) in the region of the at least one cable leadthrough (32).

5. The unit in accordance with claim 2, in which the unit (10) has a water drain (62, 64) from an interior of the cover (28).

6. The unit in accordance with claim 2, in which the at least one cover (28) has a seal sealing the at least one cover off from the housing cap (16), the housing block (12), and in the at least one cable leadthrough (32).

7. The unit in accordance with claim 2, in which the housing block (12) is a hydraulic or pneumatic block of a vehicle brake system equipped with an anti-lock and traction control system.

8. The unit in accordance with claim 7, in which the unit (10) is disposed near a wheel.

9. The unit in accordance with claim 1 in which the unit (10) has a detent connection (56, 58) on a side of the at least one cover remote from the at least one cable leadthrough (32).

10. The unit in accordance with claim 9, in which the at least one cover (28) has a reinforcement (39) in the region of the at least one cable leadthrough (32).

11. The unit in accordance with claim 9, in which the unit (10) has a water drain (62, 64) from an interior of the cover (28).

12. The unit in accordance with claim 1, in which the at least one cable leadthrough (32) forms a tensile strain relief.

13. The unit in accordance with claim 12, in which the at least one cover (28) has a reinforcement (39) in the region of the at least one leadthrough (32).

14. The unit in accordance with claim 12, in which the unit (10) has a water drain (62, 64) from an interior of the cover (28).

15. The unit in accordance with claim 1, in which the at least one cover (28) has a reinforcement (39) in the region of the at least one cable leadthrough (32).

16. The unit in accordance with claim 15, in which the unit (10) has a water drain (62, 64) from an interior of the cover (28).

17. The unit in accordance with claim 1, in which the unit (10) has a water drain (62, 64) from an interior of the cover (28).

18. The unit in accordance with claim 17, in which the water drain is embodied as a labyrinth (64).

19. The unit in accordance with claim 1, in which the at least one cover (28) has a seal sealing the at least one cover off from the housing cap (16), the housing block (12), and in the at least one cable leadthrough (32).

20. The unit in accordance with claim 1, in which the housing block (12) is a hydraulic or pneumatic block of a vehicle brake system equipped with an anti-lock and traction control system.

* * * * *